Jan. 11, 1938.  F. G. THWAITS  2,105,302
PORTABLE TANK
Filed Sept. 11, 1935  3 Sheets-Sheet 1
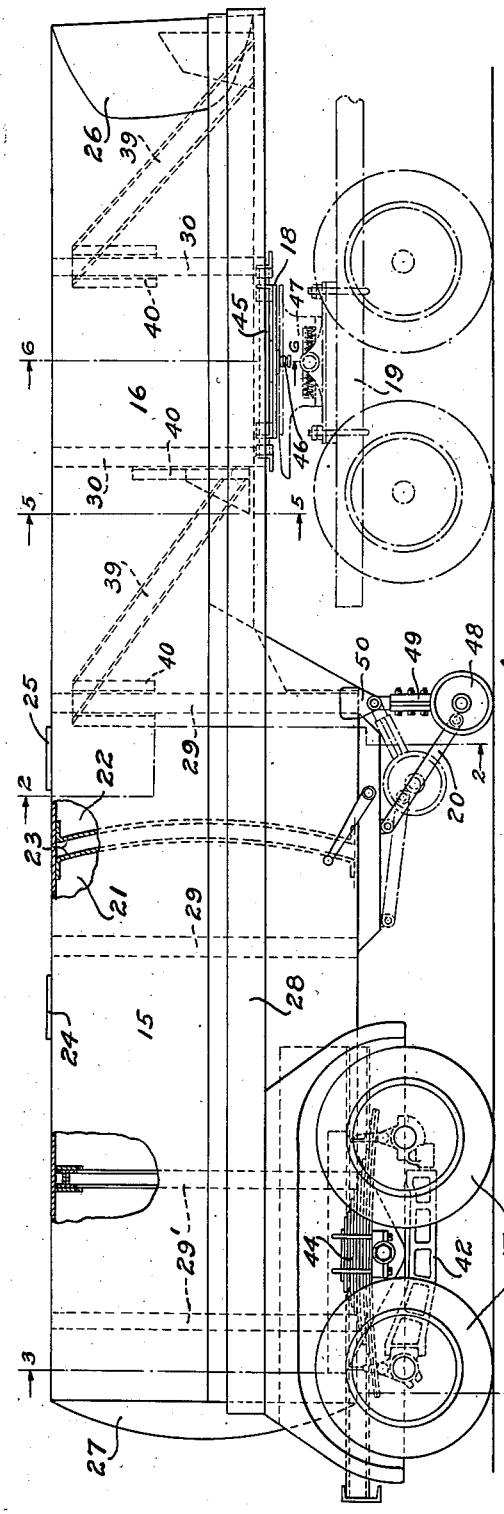
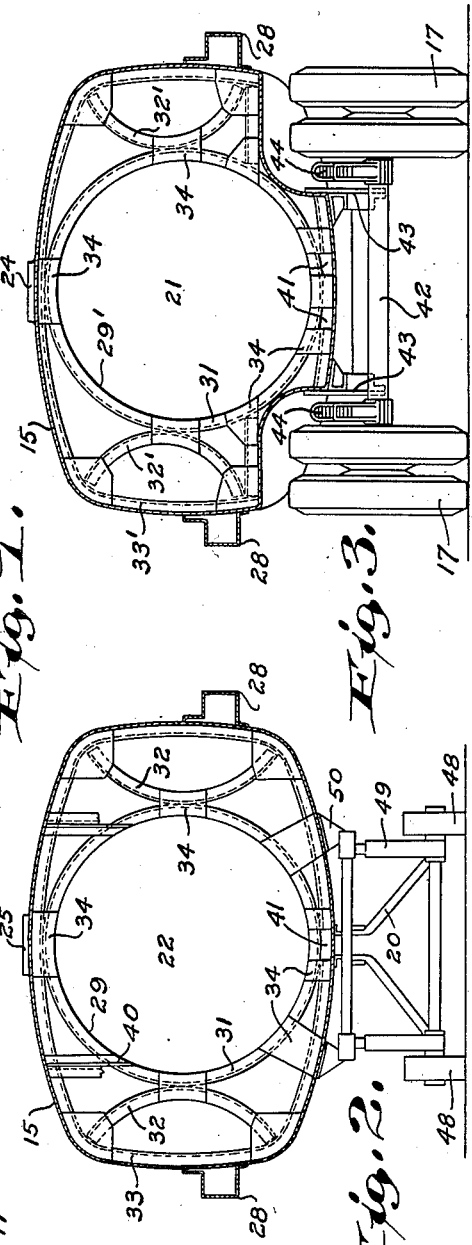
INVENTOR.
F. G. Thwaits
BY
Morsell, Lieber & Morsell
ATTORNEYS.

Jan. 11, 1938.  F. G. THWAITS  2,105,302
PORTABLE TANK
Filed Sept. 11, 1935  3 Sheets-Sheet 2
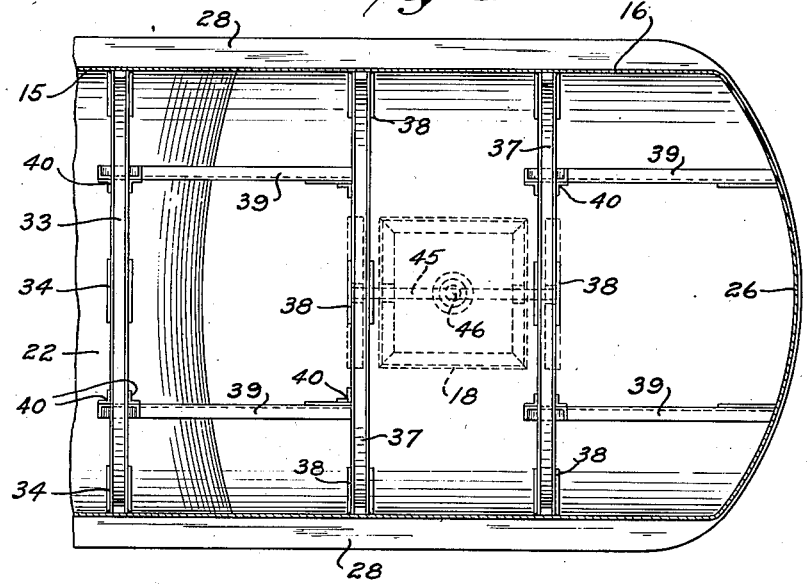
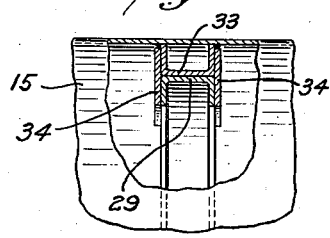
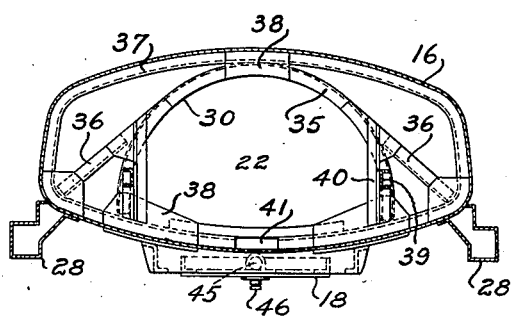
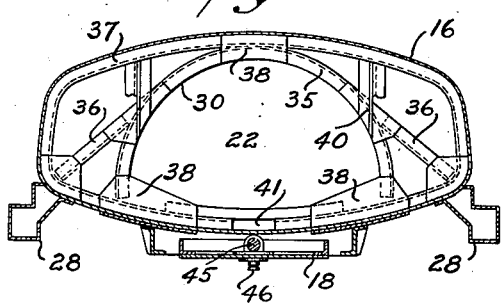
INVENTOR.
F. G. Thwaits
BY
Morsell, Lieber & Morsell
ATTORNEYS.

Jan. 11, 1938.      F. G. THWAITS      2,105,302
PORTABLE TANK
Filed Sept. 11, 1935      3 Sheets-Sheet 3

INVENTOR.
F. G. Thwaits
BY Morsell, Liebu & Morsell
ATTORNEYS.

Patented Jan. 11, 1938

2,105,302

UNITED STATES PATENT OFFICE 2,105,302

PORTABLE TANK

Frederick G. Thwaits, Wauwatosa, Wis., assignor to The Heil Co., Milwaukee, Wis., a corporation of Wisconsin Application September 11, 1935, Serial No. 40,053

10 Claims. (Cl. 220—71)

The present invention relates generally to improvements in the art of storing and transporting liquids, and relates more specifically to improvements in the construction of portable liquid confining tanks especially adapted for transportation over ordinary roads and highways.

Generally stated, an object of the present invention is to provide an improved vehicular tank of maximum capacity, which is simple and durable in construction.

It has heretofore been proposed in the art of transporting liquids such as fuel and lubricating oils, to provide maximum liquid storage capacity in a portable tank, by substantially omitting the usual external reenforcing and supporting frames, and by providing longitudinally extending or annular reenforcements disposed internally within the tank. Some of these prior so called "frameless" tanks embody internal longitudinally extending tubular and structural metal reenforcements disposed centrally within the tanks and coacting with transverse partitions therein, while others incorporate substantially annular local reenforcements hugging the interior of the shell. In most of these prior proposed assemblages, the tank structure was, however, reenforced to sustain the beam load, by some form of bracing extending longitudinally of the actual tank and disposed either within or externally of the liquid confining chamber or chambers, and in no case was the shell itself stiffened sufficiently by internal structure to effectively sustain the entire beam load. While this type of construction is generally applicable to all kinds of vehicular tanks, it is especially applicable to semi-trailer tanks of the class having rear supporting wheels permanently associated directly with the tanks, and having forward ends of reduced height cooperable through fifth-wheel mechanism with the rear end of a haulage truck. It is extremely desirable in these semi-trailer tank structures to provide maximum storage capacity, while at the same time retaining the necessary road clearances and sufficient strength to resist beam loads, and the prior frameless semi-trailers did not meet all of these requirements.

It is therefore an object of the present invention to provide an improved frameless vehicular tank structure especially applicable to semi-trailers or the like, having maximum carrying capacity and wherein the tank shell itself effectively sustains the major portion of the beam load.

Another specific object of the invention is to provide a portable tank which is extremely durable in construction, and which is formed to effectively resist both inward and outward distortion, and longitudinal deflection.

A further specific object of the invention is to provide a new and useful multiple compartment tank assemblage having effective internal bracing disposed transversely of the shell for maintaining true cross-section, but which does not interfere with complete drainage and flushing of the compartments.

Still another specific object of the present invention is to provide an improved trailer truck tank wherein the use of longitudinally extending internal and external braces and frames is unnecessary, and which provides for necessary road clearances without sacrificing capacity.

An additional specific object of the invention is to provide improved reenforcing means for an elongated container having either substantially rectangular or elliptical transverse cross section, which can be readily applied at moderate cost, and which will maintain the original cross-section at all times.

These and other specific objects and advantages of the invention will be apparent from the following detailed description.

A clear conception of several embodiments of the present improvement, and of the mode of constructing several types of semi-trailer tanks utilizing the invention, may be had by referring to the drawings accompanying and forming a part of this specification in which like reference characters designate the same or similar parts in the various views.

Fig. 1 is a part sectional side elevation of a semi-trailer tank assemblage of either substantially polygonal or elliptical transverse cross-section, having rear supporting wheels and a forward portion of reduced height;

Fig. 2 is a transverse section through a substantially polygonal sectioned tank structure, the section being taken along the line 2—2 of Fig. 1;

Fig. 3 is another transverse section through a similar type of tank, taken along the line 3—3 of Fig. 1;

Fig. 4 is a horizontal section through a fragment of the tank of Fig. 1, showing the bracing within the forward end thereof;

Fig. 5 is a transverse section through the tank of Figs. 1, 2, and 3, the section being taken along the line 5—5 of Fig. 1;

Fig. 6 is a similar section through the forward portion of the same tank, taken along the line 6—6 of Fig. 1;

Fig. 7 is an enlarged fragmentary section through the shell and one of the improved transverse reenforcements;

Figure 8:
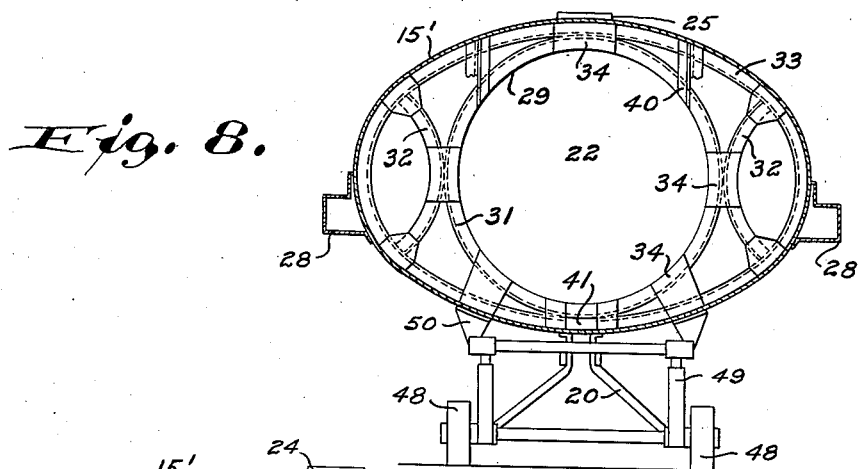
Fig. 8 is a transverse section through an elliptical sectioned tank, which in elevation would appear similar to Fig. 1, and the section being taken at the plane, corresponding to the line 3—3.
Figure 9:
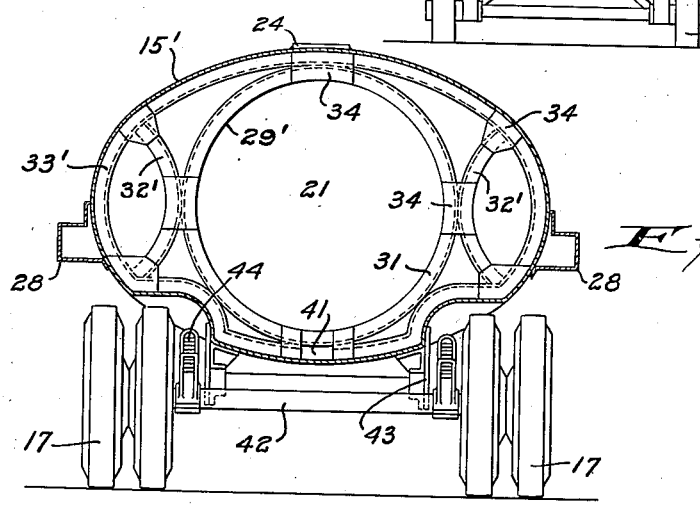
Fig. 9 is another transverse section through the elliptical sectioned tank, the section being taken at the rear end of the tank.

While the invention has been shown as being specifically applied only to semi-trailer, multiple compartment tanks having forward portions of reduced height, it is not intended to unnecessarily restrict the scope by virtue of this specific embodiment, since some of the improvements may be more generally applicable to other types of tank assemblages.

Referring specifically to Figs. 1 to 7 inclusive of the drawings, the improved tank assemblage shown therein comprises in general a main shell 15 having a forward portion 16 of reduced height and also having substantially rectangular or polygonal transverse cross sections throughout its length; rear wheels 17 coacting with the lower slightly indented rear portion of the shell 15; fifth-wheel mechanism 18 carried by the lower part of the reduced forward portion 16 and cooperable during transportation of the tank, with the rear end of a haulage vehicle 19; and a removable support 20 carried by the medial portion of the tank for supporting the structure when released from the truck or vehicle 19.

The main shell 15 may be formed in any suitable manner, from plate steel or the like, and the joints between the adjoining steel plates may be welded or otherwise formed so as to provide a smooth exterior. The interior of the shell 15 is segregated into two liquid receiving compartments 21, 22 by means of a double partition 23 formed of two similarly or reversely dished plates spanning the interior of the shell and rigidly attached thereto. The rear compartment 21 is located within the larger portion of the shell 15 and has an upper manhole 24 and the usual drainage piping, not shown, communicating with the lower portion thereof. The front compartment 22 extends throughout the forward reduced portion 16 of the shell 15 and partially along the larger rear tank portion up to the partition 23, and this front compartment is likewise provided with a manhole 25 and with the usual lower drainage piping, not shown. The front head 26 of the tank is preferably rounded or curved as shown in order to provide clearance when turning corners; and the rear head 27 may be bulged outwardly as shown, or it may be inclined downwardly and rearwardly to form a beaver-tail. The opposite sides of the main shell 15 may also be provided with elongated hose carriers 28 attached to the shell by welding or otherwise but these hose carriers may be omitted when extreme side clearances are desired.

In order to enable the tank structure to carry the beam load, when the compartments 21, 22 are filled with liquid, and the shell 15 is resting on the rear wheels 17 and front fifth-wheel mechanism 18, the shell is made of relatively strong plate, and transverse internal reenforcements 29, 30 are provided in addition to the double partition 23 and the end heads 26, 27. These reenforcements 29, 30 constitute an important part of the present improvement; and each of the reenforcements 29 located in the large medial portion of the shell 15, comprises a circular channel brace 31, two substantially semi-circular side braces 32, a channel beam 33 embracing or surrounding the coacting braces 31, 32, and connecting elements 34 rigidly uniting the channel shaped reenforcing members, as clearly shown in Fig. 2. The reenforcements 29' located in the rear end of the larger portion of the shell 15 where the lower portion of the shell is indented to clear the wheels 17 as shown in Fig. 3, are generally similar to the medial reenforcements 29, except that the side braces 32' are somewhat shorter, and the continuity of the channel beam 33' has been interrupted near the indentations. Each of the reenforcements 30 located in the front reduced portion 16 of the shell 15, comprises a substantially semi-circular central channel brace 35, two outwardly and downwardly directed side channel struts 36, a channel beam 37 embracing or surrounding the coacting brace 35 and struts 36, and connecting elements 38 rigidly uniting the channel shaped reenforcing members, as clearly illustrated in Figs. 5 and 6. There may be any desired number of these transverse reenforcements 29, 30, depending upon the length and load capacity of the tank structure, and the successive reenforcements 30 located near the fifth-wheel mechanism 18, may be additionally strengthened and braced by means of inclined channel shaped beam members 39 and angle braces 40 as shown in Figs. 1, 5 and 6. While the main reenforcing elements are preferably formed of channel shaped beams as shown in Fig. 7, when heavy duty is required, these elements may in some cases be formed of tubing or angle iron, or even flat strips; and in cases of extremely heavy duty they may be formed of I-beams or rails. It is also noteworthy that while the channel beams 33, 37 hug and substantially coact with the entire internal adjoining surface of the shell 15, they do not extend entirely across the tank bottom so as to prevent complete drainage of liquid, and openings 41 are in fact provided through all of the reenforcements 29, 30 for drainage purposes.

The rear wheels 17 may be of any desired number and are rotatably supported in a truck 42 which is pivotally attached to brackets 43 secured to the shell 15 at the lower indentations therein, and leaf springs 44 are interposed between the brackets 43 and the swinging ends of the truck 42. The fifth-wheel mechanism 18 comprises a rectangular frame pivotally mounted to swing about a longitudinal pin 45, and having a king pin 46 which is detachably cooperable with a receiving socket formed in the cooperating fifth-wheel mechanism 47 mounted upon the vehicle 19. These coacting fifth-wheel mechanisms 18, 47 permit relative articulation between the traction vehicle 19 and the trailer tank, and provide substantially a universal joint. The removable support 20 which is disposed between the wheels 17 and the mechanism 18, comprises a pair of wheels 48 carried by a frame 49 pivotally attached to brackets 50 secured to the bottom of the shell 15; and this frame 49 and the wheels 48, when not in use, may be swung into inactive position as shown in dot-and-dash lines in Fig. 1, in a well known manner. Suitable guards for the rear wheels 17, fifth-wheel mechanism 18, and other exposed elements, may also be provided wherever necessary or desirable for protective purposes and in order to enhance the general appearance of the assemblage.

Referring to Figs. 8 to 11 inclusive of the drawings, the improved tank assemblage shown therein is generally similar to that just described, but has elliptical rather than substantially rectangular, transverse cross-section. In side elevation, this modified structure would appear substantially the same as illustrated in Fig. 1, and this modified tank assemblage also comprises in general a main shell 15' having a forward portion 16' of reduced height, but having substantially elliptical transverse cross-sections throughout the tank length; rear wheels 17 coacting with the lower slightly indented rear portion of the shell 15'; fifth-wheel mechanism 18 carried by the lower part of the reduced forward portion 16' and cooperable during transportation of the tank, with the rear end of a haulage vehicle 19; and a removable support 20 carried by the medial portion of the tank, for supporting the structure when released from the vehicle 19.

Figure 10:
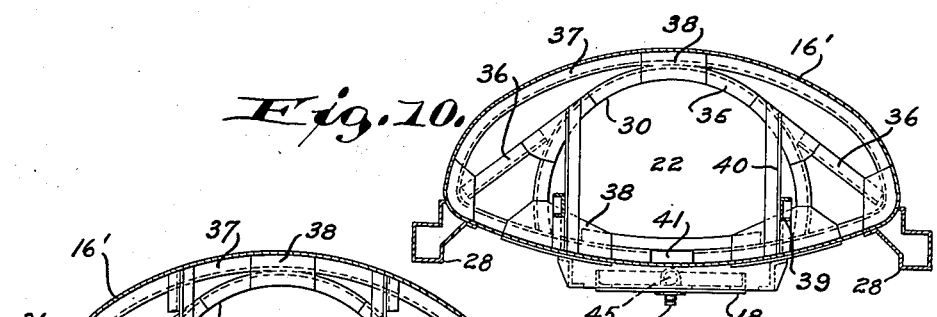
Fig. 10 is a transverse section taken through the front reduced portion of the elliptical sectioned tank, near the plane corresponding to the line 5—5 of Fig. 1.
Figure 11:
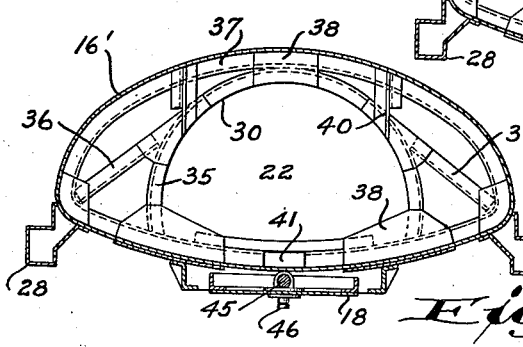
Fig. 11 is a similar section through the same tank, taken at the fifth wheel mechanism.

The modified tank shell 15' may be formed in a manner similar to that previously described, and may if desired, be provided with one or more transverse partitions and with end heads 26, 27. This modified tank structure is likewise devoid of longitudinal internal reenforcements but is provided with reenforcements 29, 30 at intervals throughout the length of the shell 15'. Each of the reenforcements 29 in the large medial portion of the shell 15' consists of a circular channel brace 31, two substantially semi-circular side braces 32, an elliptical channel beam 33 surrounding the coacting braces 31, 32, and connecting plate elements 34 rigidly uniting the channel shaped reenforcing members, as clearly shown in Fig. 8. The reenforcements 29' which are located in the rear end of the tank where the shell 15' is indented to clear the wheels 17, are of the form shown in Fig. 9, and each of these comprises a circular central channel brace 31, two semi-circular side braces 32', a substantially elliptical channel beam 33', and connecting elements 34 rigidly uniting the channel braces and beam. Each of the reenforcements 30 disposed within the forward reduced portion 16' of the modified shell 15', is composed of a substantially semi-circular central channel brace 35, two outwardly inclined side channel struts 36, a channel beam 37 surrounding the brace 35 and the struts 36, and connecting plate elements 38 rigidly uniting the channel members, as illustrated in Figs. 10 and 11. As in the embodiment previously described, there may be any desired number of reenforcements 29, 30 spaced at intervals throughout the length of the tank, and the successive reenforcements at the forward end of the tank may be braced and stiffened by means of inclined beam members 39 and angle braces 40. Openings 41 are also preferably provided in the modified assemblage, in order to take care of proper and complete drainage of liquid from within the tank compartments 21, 22.

The rear wheels 17, fifth-wheel mechanism 18, and supports 20 of the modified assemblage, may be the same as the corresponding parts of the structure previously described, and the elliptical shell 15' may likewise be provided with hose carriers 28 and with suitable protective guards.

In both of the improved tank assemblages herein described, the local transverse reenforcements 29, 30 constitute local unitary braces which coact with the outer shells, not only so as to effectively prevent inward and outward distortion, but to also stiffen and strengthen the shells in order to resist longitudinal bending. Each of these assemblages will act to sustain the beam loads, without the aid of external or internal longitudinally extending braces or frames, and the circular and semi-circular braces cooperating with the surrounding members constitute rigid bracing means for adding stiffness to the outer shells. The improved reenforcements 29, 30 may be assembled before being inserted within the tank shells; and besides occupying minimum space, these bracing elements do not interfere with normal use of the assemblage. While the beam members 39 are shown as being forwardly and downwardly inclined, they may be upwardly inclined if so desired. The rigidity of the bracing structures can be enhanced by proper selection of component elements, and standard structural metal bars of any suitable cross-section may be employed.

From the foregoing description it will be apparent that the present invention provides an improved vehicular tank structure of maximum capacity, which is extremely simple and durable in construction. While the present improvement is especially applicable to semi-trailer tank structures wherein the forward end of the tank is of reduced height, the improved reenforcements are obviously more generally applicable to other types of vehicle tanks. The improved tank assemblages are substantially frameless, and possess great strength for resisting beam loads while maintaining the original tank cross-section, in spite of the fact that longitudinally extending braces, both internal and external, are substantially eliminated. The internal transverse reenforcements are not visible in the completed structure, and therefore permit maintenance of necessary road clearances and eliminate undesirable external projections; and the improvement may be manufactured at moderate cost. The transverse reenforcements are also applicable advantageously to single as well as to multiple compartment tanks, and to shells having transverse cross-sections other than those shown. An important feature of the present improvement, is the provision of a central substantially annular brace having side braces coacting therewith and extending toward the upper and lower corners of the shell. This assemblage positively prevents distortion of the shell section even when subjected to external or internal pressures, or to beam loads, and is especially effective in rectangular sectioned tanks.

It should be understood that it is not desired to limit the present invention to the exact details of construction herein shown and described, for various modifications, within the scope of the claims, may occur to persons skilled in the art.

I claim:—

1. A portable tank comprising, an elongated shell having substantially elliptical transverse cross-section, a bracing member secured to and extending transversely of the interior of said shell, a substantially circular brace disposed centrally within and attached directly to the upper and lower portions of said member, and other braces interposed between the opposite sides of said circular brace and the corresponding sides of said member.

2. A portable tank comprising, an elongated shell, a bracing member secured to the interior of said shell and extending transversely of and substantially around the shell axis, an annular brace secured centrally within and secured directly to the top and bottom of said member, and side braces interposed between the opposite sides of said annular brace and the remote slide portions of said member.

3. A portable tank comprising, an elongated shell having substantially elliptical transverse cross-section, a series of transverse reenforcements within said shell each including a central substantially annular brace and side braces connecting the opposite sides of said annular brace with the corresponding sides of said shell, and bracing means connecting the lower portion of one of said reenforcements directly with an upper portion of an adjacent reenforcement.

4. A tank comprising, a shell of substantially rectangular cross-section having greater width than height, and an internal reenforcement for said shell comprising a substantially circular brace disposed centrally of the shell, side braces connecting the opposite sides of said central brace with the upper and lower corners of the shell, the central top and bottom portions of said shell being disposed substantially tangent to the upper and lower portions of said circular brace, and means connecting the upper and lower ends of said braces directly with said circular brace.

5. A tank comprising, a shell of substantially rectangular cross-section having greater width than height, and a transverse internal reenforcement for said shell comprising a member extending along the interior of said shell, a substantially circular brace disposed centrally within said member and being secured to the upper and lower medial portions of the latter, and side braces connecting the opposite sides of said central brace with the upper and lower corners of said member and of said shell, the central top and bottom portions of said member being disposed substantially tangent to the upper and lower portions of said circular brace.

6. A tank comprising, a shell of substantially rectangular cross-section having greater width than height, and an internal reenforcement for said shell comprising a substantially continuous member following the contour of and coacting with the interior of said shell, a substantially circular brace disposed centrally within said member, and side braces connecting the opposite sides of said circular brace with the upper and lower corners of said member, the central top and bottom portions of said member being substantially tangent to the upper and lower portions of said circular brace and being attached directly thereto.

7. A tank comprising, a shell having greater width than height, and an internal reenforcement for said shell comprising an annular brace having its central top and bottom portions coacting with the central top and bottom portions of said shell, side braces connected to the opposite sides of said annular brace and to the remote side portions of said shell, and bracing means connecting the outer ends of said side braces directly with the upper and lower portions of said annular brace.

8. A tank comprising, a shell having greater width than height, and an internal reenforcement for said shell comprising a substantially circular brace having its central top and bottom portions coacting with the central top and bottom portions of said shell, side braces connected to the opposite sides of said circular brace and to the remote upper and lower side portions of said shell, and bracing means connecting the upper and lower end portions of each of said side braces directly with the adjacent upper and lower medial portions of said circular brace.

9. A tank comprising, a shell having horizontally elongated transverse cross-section, an annular brace having its central top and bottom portions coacting respectively with the central top and bottom portions of said shell, substantially semi-circular side braces fastened at their medial portions to the opposite sides of said annular brace and having upper and lower ends extending outwardly toward and coacting with the remote upper and lower side portions of said shell, and bracing means connecting the ends of said side braces directly with the central top and bottom portions of said annular brace.

10. A tank comprising, a shell having horizontally elongated transverse cross-section, a substantially circular brace having its central top and bottom portions coacting respectively with the central top and bottom portions of said shell, arcuate side braces fastened at their medial portions to the opposite sides of said circular brace and having upper and lower ends extending outwardly in close proximity to and coacting with the remote upper and lower side portions of said shell, and bracing means connecting the upper and lower end of each of said side braces directly with the upper and lower portions of said circular brace.

FREDERICK G. THWAITS.